W. B. KNAPP.
SCREEN, CURTAIN, AND THE LIKE.
APPLICATION FILED SEPT. 8, 1916.
1,355,608.  Patented Oct. 12, 1920.
3 SHEETS—SHEET 2.
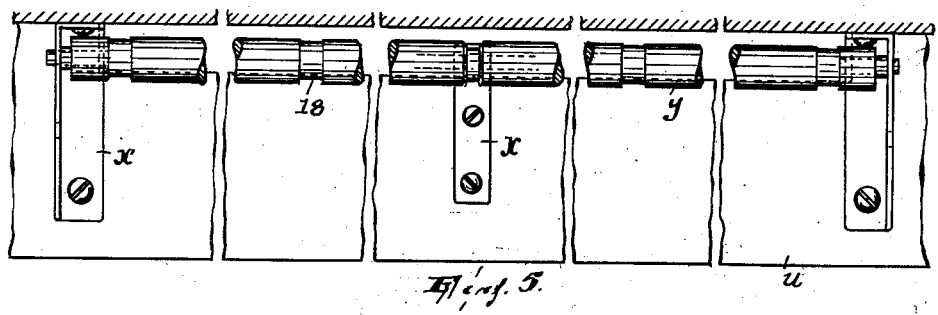
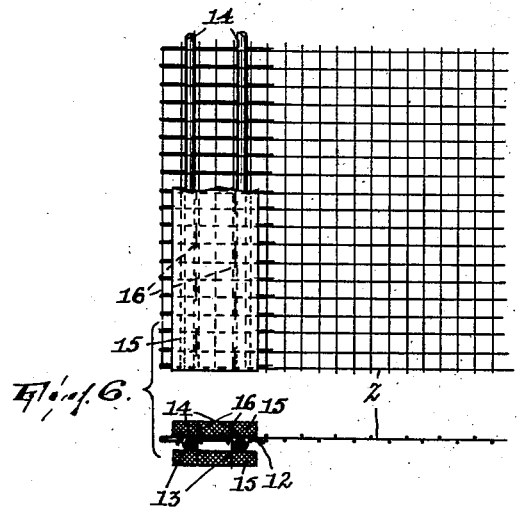

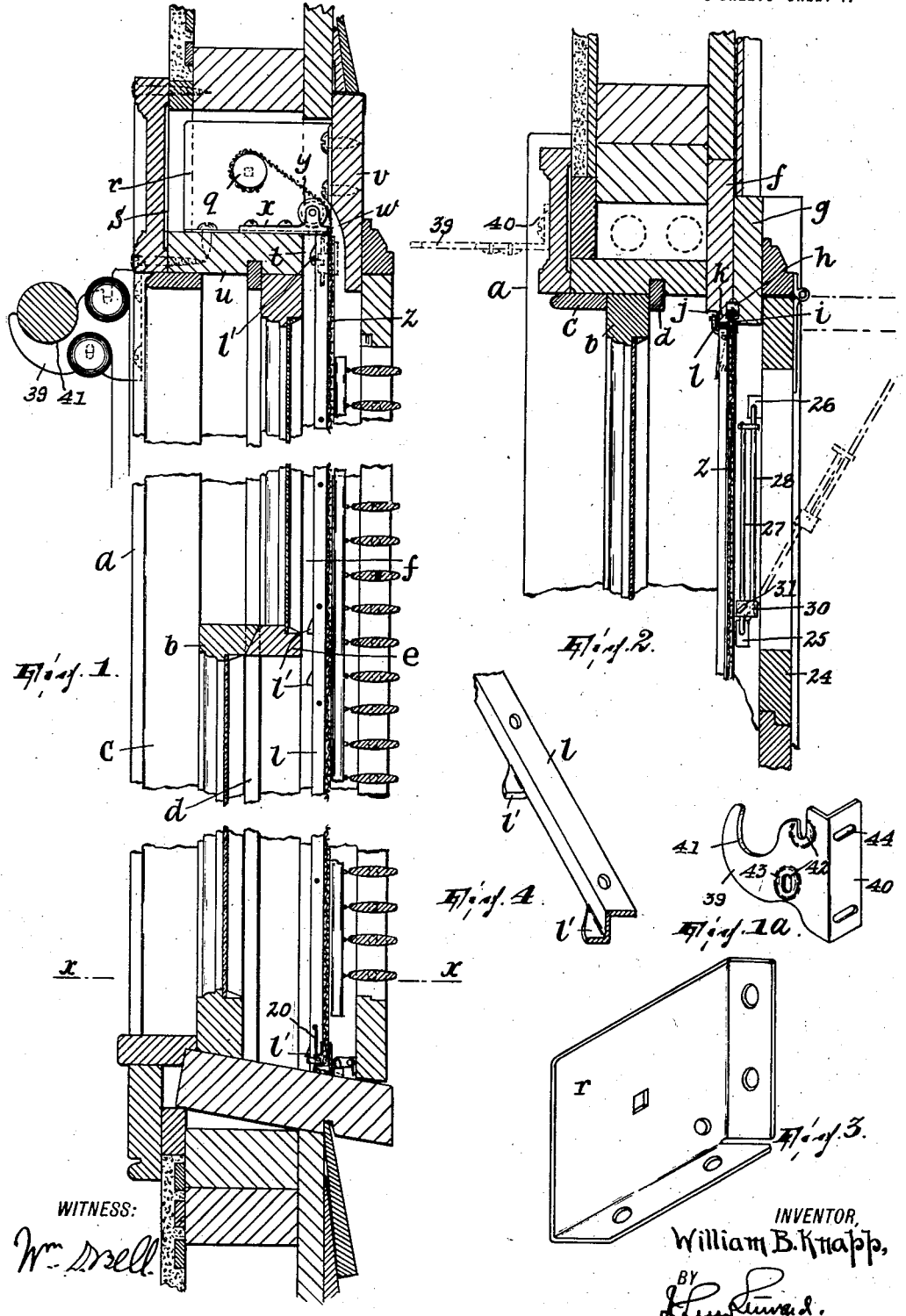

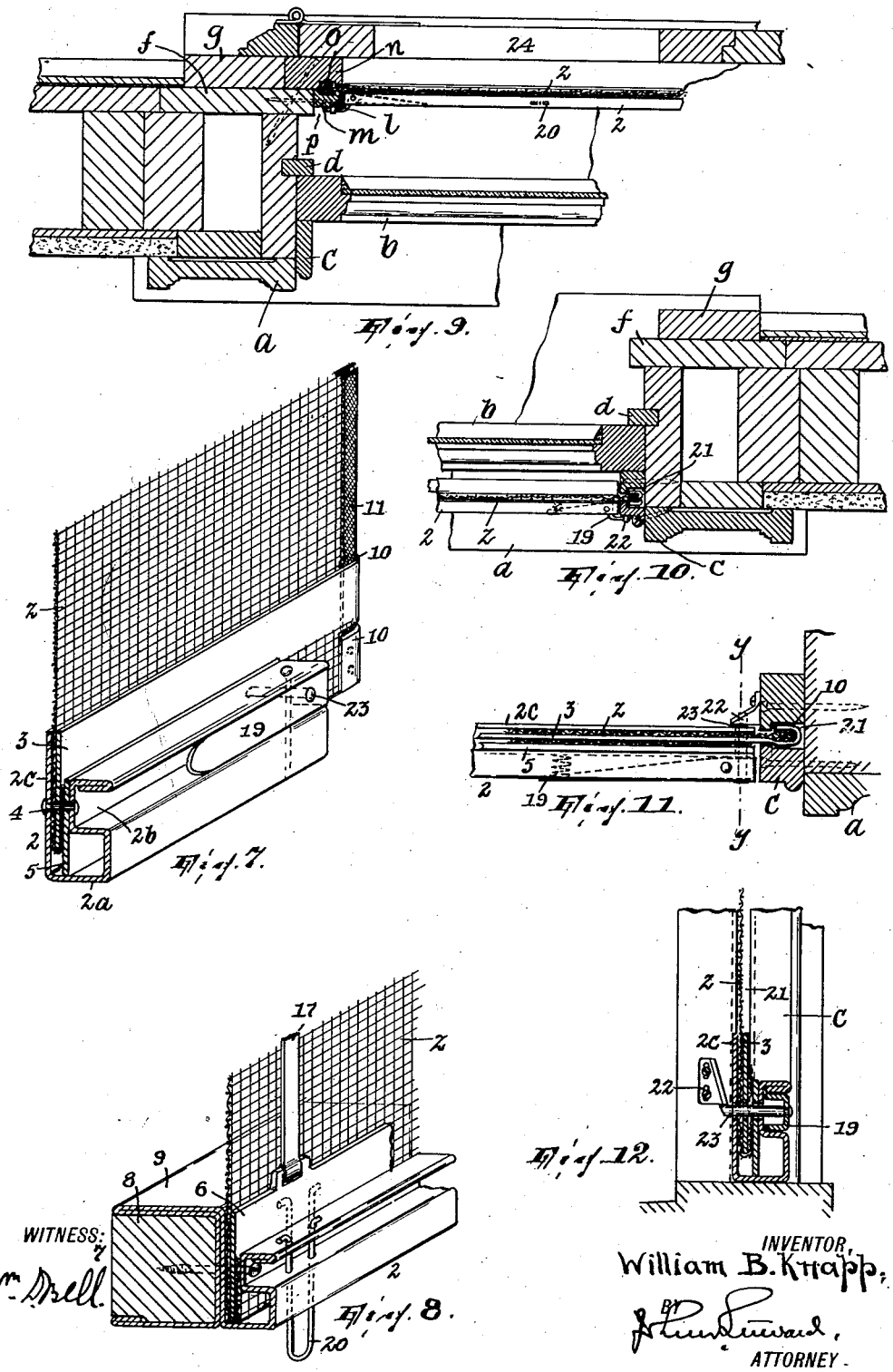

UNITED STATES PATENT OFFICE.

WILLIAM B. KNAPP, OF PATERSON, NEW JERSEY.

SCREEN, CURTAIN, AND THE LIKE.

1,355,608.   Specification of Letters Patent.   Patented Oct. 12, 1920.

Application filed September 8, 1916. Serial No. 118,978.

*To all whom it may concern:*

Be it known that I, WILLIAM B. KNAPP, a citizen of the United States, residing at Paterson, in the county of Passaic and State of New Jersey, have invented certain new and useful Improvements in Screens, Curtains, and the like, of which the following is a specification.

My present invention relates to window appurtenances, and it consists in certain improvements in screens, curtains and the like of the kind which are wound on rollers and guided at their marginal edges in suitable ways, as in my Patents Nos. 963,900, 1,068,780 and 1,138,668.

In the accompanying drawings,

Figure 1 is a vertical sectional view of a window provided with my improvements and Fig. 1ª a detail thereof.

Fig. 2 is a horizontal sectional view on the line $x$—$x$ of Fig. 1;

Fig. 3 shows in perspective one of the brackets for supporting the roller on which the screen, curtain or the like is adapted to be wound;

Fig. 4 is a perspective view of a detail shown in Figs. 1 and 2;

Fig. 5 is a plan view of a curtain guide roller shown in Fig. 1 and the parts associated therewith;

Fig. 6 shows in plan and section the marginal portion of the screen;

Fig. 7 is a perspective view illustrating said screen and the sliding cross-bar;

Fig. 8 is a similar view illustrating a modification;

Fig. 9 is a view similar to Fig. 2, illustrating a modification of the means to guide the margins of the screen;

Fig. 10 is a horizontal sectional view of substantially the same character as Fig. 2, showing another modification appertaining to the guiding of the margins of the screen;

Fig. 11 is a horizontal sectional view showing a modification of the means to hold the screen at different points in its travel; and Fig. 12 is a sectional view on the line $y$—$y$ in Fig. 11.

$a$ is the window frame in which the inside sash $b$ is arranged to travel in vertical grooves formed by the inside stop beads $c$ and the parting strips $d$ and in which the outside sash $e$ is arranged to slide in grooves formed by said parting strips and by wooden plates $f$ which are sometimes called the "hanging stiles" of the window frame.

The screen, curtain or the like in my previous patents has its side margins guided and held in guides attached to the window frame. In the present case these guides or ways are incorporated in the window frame, Figs. 1, 2 and 9 illustrating the screen arranged outside of the two sashes and Figs. 10 and 11 showing the screen arranged inside thereof.

Referring, now, to Figs. 1 and 2, $g$ (Fig. 2) is a plate or "architrave" which is secured to the outer face of each plate $f$ so that their inner edges are flush, and $h$ is an elongated passage formed vertically in the adjoining faces of the plates $f$ and $g$ near their said inner edges, $i$ being a slot entering to such passage from the inner edges of the plates, the passage and slot forming a substantially T-shaped groove in the plates. Preferably a rabbet $j$ is formed in the plate $f$ next to the sash $e$, the tongue $k$ left on said plate being covered by a metallic angle strip $l$ having suitable stops $l'$ projecting into the rabbet toward the sash.

In Fig. 9 a modification is shown in which each plate $f$ is not rabbeted to produce a tongue and the architrave $g$ is not extended inward, but instead a strip $m$ is secured to the inner edge, and a strip $n$ is secured to the outer face of plate $f$, the said strip being provided with a T-shaped groove $o$, the same as that already described.

Strip $m$ forms with plate $f$ a rabbet $p$ corresponding to rabbet $j$, and it may be equipped with the angle strip $l$ having the stops $l'$.

$q$ is a spring roller journaled in brackets $r$ in a case or cabinet $s$ formed in the top of the window frame. Parallel with this roller and extending the full width of the case there is a passage or slot $t$ formed between the outer edge of the bottom wall $u$ of the case and its outer wall $v$, which may be cut away as at $w$ in forming the slot. On the wall $u$ are secured a series of brackets $x$ which preferably overhang the slot $p$ and in which is journaled a guide roller $y$ over which the screen $z$, wound on the roller, extends downwardly through the slots; if the screen is so wide that the roller would sag if made in one piece, it may be made in several sections, as in fact shown in Fig. 5.

The lower edge of the screen has attached thereto a cross bar 2 formed substantially the same as in my Patent No. 1,138,668, to wit: a sheet metal strip is bent longitudinally to form the hollow portion $2^a$ and the channel portion 2ᵇ and back plate 2ᶜ; between the back plate 2ᶜ and channel portion 2ᵇ, with the lower edge of the screen folded around its lower edge, is a strip 3, the several parts 2ᶜ, 3, 2ᵇ and z being clamped together by the rivets 4. In the present instance there is also a strip 5—not found in my said patent—clamped by the rivets between the strip 3 and the channel portion 2ᵇ and reaching down and contacting with the bottom of the hollow portion 2ᵃ, so as to stiffen the latter in instances where the cross-bar is long or the metal thereof is thin. As shown in Fig. 8, the reinforcement afforded by the strip 5 may be accomplished by the strip, as 6, around which the screen is folded, strip 5 being eliminated and strip 6 reaching to the bottom of the hollow portion 2ᵃ. The cross bar may also be reinforced by providing at its outer face the elongated member 7 in the present case (Fig. 8) shown as including a wooden core 8 and a metallic shell 9 which is in effect an extension of the back wall 2ᶜ.

As in my said Patent No. 1,138,668 the ends of the strip 3 are split, the split portions being rebent in opposite directions as at 10, Fig. 1, to form thickened-up portions to travel in the guides formed by the T-shaped grooves h—i or o aforesaid. The side margins of the screen, which also travel in said groove, are also thickened up, as at 11, so as to be retained in said grooves. According to the present invention this is accomplished in a way to reinforce the margin against longitudinal stretching and otherwise, preferably as shown in Fig. 6; that is to say, having laid a pair of stout flexible wires or the like against the screen and parallel with its margin and having bent back the edge of the screen upon itself, as at 12, and having bent either the body of the screen or said edge 11 so as to form grooves 13 therein in which the wires 14 repose, flexible strips 15 are secured, as by stitches 16 passing through said strips, the screen and its edge 12, on both faces of the screen, with the wires between them the thickened-up ends 10 of strip 3 rather snugly fitting the wide part of groove o occupied by them, so that the strip cannot cut away the edges at the mouth of the groove.

To prevent the screen stretching longitudinally if the screen is wide and the cross bar bends somewhat when pressure is applied to its mid-portion in lowering the screen, metallic or other non-stretching reinforcing tapes 17 may be attached to the cross bars (Fig. 8) on the one hand and the roller q on the other; 18, Fig. 5 designates grooves in the roller y to accommodate these tapes.

As in my Patent No. 1,138,668 there are pivoted in the channel portions 2ᵇ of the cross bar the spring latches 19 adapted to engage the stops l' on the strips l to retain the screen against the pull of the spring roller q at any desired elevation. Should the screen accidentally run up past all the stops the cross bar will eventually be checked by the overhanging brackets x. The cross bar is equipped with staples 20 having limited sliding movement therein (Fig. 8); these will recede on contact with the sill when the screen is down, but will be depressed (positively so, by contact with the brackets x, should the screen run up to its full limit) when the screen is elevated. The rabbet j in Fig. 2 and p in Fig. 9 accommodates the acting end of the latch, so that it has clearance with respect to the outer sash.

In Figs. 10, 11 and 12 the screen is arranged inside of the sashes instead of outside. The inner stop bead c is split longitudinally and otherwise shaped to produce the T-shaped guiding groove 21 to receive the thickened-up margins and the fins on the cross bar formed by the ends of the strip 3. In this case, the stops 22 (to be engaged by the latches 19) may project from the inside face of the stop bead (Fig. 10). Or said stops may project toward the other stop bead (Figs. 11 and 12), being outside of the screen, in which case the latch has as its acting end a pin 23 riveted therein and penetrating the cross-bar, the pin and the stops being beveled as shown in Fig. 12 so as to clear each other when the screen is lowered.

Having thus fully described my invention, what I claim as new and desire to secure by Letters Patent is:—

1. In combination, a sash-guiding frame having opposite sash-guideways, a sash sliding in the guideways, a roller journaled in the frame parallel with the sash, a fabric wound on the roller, and a cross-bar attached to the fabric, the part of the frame at one side of each guideway having grooves formed therein parallel with the guideway and receiving the side margins of the fabric and also having between each groove and guideway a rabbet receiving the adjoining end of the cross-bar.

2. In combination, a frame having parallel sides, a roller journaled therein, a fabric wound on the roller, a cross-bar attached to said fabric and having its ends guided by said sides for movement longitudinally thereof, means on the cross-bar to secure the same to said sides at different points in its travel, and angle-strips secured to said sides and affording wiping contact to said means and having stops to be engaged thereby.

3. In combination, a frame having parallel sides, and a transverse case connecting said sides, a spring roller journaled in the case, a fabric wound on the roller, a cross-bar attached to the fabric and guided at its ends by said sides of the frame, said case having a slot receiving the fabric and means, extending across the frame between said sides, to guide the fabric, said means affording a stop for the cross-bar in its travel toward the roller.

4. A cross-bar for the purpose described including an elongated sheet metal piece bent longitudinally into a longitudinal hollow portion open lengthwise and having its edge portions in parallel planes and also including a strip between said edge portions reaching to and contacting with the opposite side of said hollow portion, one edge of a roll of fabric being adapted to be received in the opening of said hollow portion, and means to clamp the said edge portions, the said edge of the fabric and strip together.

5. In combination, an open substantially rectangular frame structure, a roller journaled therein, a fabric wound on the roller, a cross-bar attached to the fabric and guided at its ends in opposite sides of said structure, said structure having means to limit the travel of the cross-bar with the fabric in each direction, and devices to be caught hold of to move the cross bar movable in the same from one toward the other of said means and adapted to be shifted by the latter when the cross-bar approaches into contact therewith.

6. In combination, a frame having an opening therein, slidable screen means arranged in the frame and movable into more or less obstructed relation to said opening, said frame having stops arranged at intervals along the path of travel of said means, and a latch to engage said stops pivoted in said means and including a pivoted body portion arranged at one side of said means and a pin fixed in said body portion and penetrating said means and movable into and out of alinement with the stops.

7. In a screen, curtain or the like, a stiff fabric sheet adapted to be wound on a roller and having its side margins bent back on themselves, one thickness at the bent-back edge-portion of each margin being formed with an inside longitudinal groove spaced from the line of bending back of the fabric, and an elongated flexible member held by and between the thicknesses at each bent-back edge-portion and occupying the groove thereof.

8. In a screen, curtain or the like, a stiff fabric sheet adapted to be wound on a roller and having its side margins bent back on themselves, one thickness at the bent-back edge-portion of each margin being formed with an inside longitudinal groove, an elongated flexible member held by and between the thicknesses at each bent-back edge-portion and occupying the groove thereof, and flat elongated means secured to one outer face of each such edge-portion.

In testimony whereof I affix my signature.

WILLIAM B. KNAPP.